United States Patent [19]
Anderson et al.

[11] Patent Number: 6,084,365
[45] Date of Patent: Jul. 4, 2000

[54] ACTUATOR HAVING TIMER-CONTROLLED POWER SWITCHING DEVICE

[75] Inventors: Dean B. Anderson, Wonder Lake; Guy P. Caliendo, Algonquin; Mike Strozewski, Mt. Prospect, all of Ill.

[73] Assignee: Siemens Building Technologies, Inc., Buffalo Grove, Ill.

[21] Appl. No.: 09/301,928

[22] Filed: Apr. 29, 1999

[51] Int. Cl.[7] ........................................... H02K 7/10
[52] U.S. Cl. .............................................. 318/362; 310/83
[58] Field of Search .................................... 165/200, 201, 165/266, 267, 270, 42, 47, 48.1, 58, 59; 237/2 A, 46; 318/362; 310/83, 89, 93, 77; 335/2, 3

[56] References Cited

U.S. PATENT DOCUMENTS

| | | | |
|---|---|---|---|
| 3,575,621 | 4/1971 | Voland | 310/112 |
| 3,598,214 | 8/1971 | Harris | 192/148 |
| 4,557,317 | 12/1985 | Harmon, Jr. | 165/2 |

*Primary Examiner*—Robert E. Nappi
*Assistant Examiner*—Rita Leykin
*Attorney, Agent, or Firm*—Greer, Burns & Crain, Ltd.

[57] ABSTRACT

An electromechanical actuator is adapted to be connected to an external device for displacing the external device to a predetermined position and maintaining the external device at that position. The actuator includes a housing which holds a drive motor for driving the external device to the predetermined position when the motor is energized and a brake mechanism for maintaining the external device at the predetermined position when the brake mechanism is activated. A switching device generates switching signals for energizing the motor to drive the external device to the predetermined position and for de-energizing the motor and activating the brake mechanism when a predetermined time has passed from a moment the drive motor is energized, to maintain the external device at the predetermined position.

7 Claims, 3 Drawing Sheets

ACTUATOR HAVING TIMER-CONTROLLED POWER SWITCHING DEVICE

The present invention generally relates to electromechanical actuators, and more particularly to an electromechanical actuator having a timer function for switching power between a drive motor and a reduced-power holding mechanism.

Electro-mechanical actuators are commonly utilized, for example, in heating, ventilating and air conditioning (HVAC) installations for actuating dampers or valves which are used to control air flow, especially during emergency situations where fire and smoke are involved. These actuators are typically provided with a retracting function that positions the damper to a predetermined default position when the power to the actuator is interrupted, whether intentionally shut off by an operator or through a power failure. In this manner, the actuator automatically displaces the damper, without electric power, to a safeguard position to assist in routing or containing the fire and/or smoke to areas that are designated by a preestablished fire prevention plan.

The retracting function of many conventional actuators is typically performed by a spring mechanism. To counteract the retracting force of the spring mechanism so that the damper is maintained at the normal operating position, some known actuators employ the same motor which initially displaced the damper away from the default position. As such, those actuators continually draw power in a stalled condition when the damper reaches a mechanical end stop that defines the normal operating position. This arrangement is disadvantageous in that the actuators provided for fire and smoke applications are typically held in the normal operating position for approximately 99% of their life, and as a result, consume relatively large amount of power. The power consumption issue becomes more significant when a multitude of actuators of the same type are used in some large scale HVAC systems, because the total power consumption of these actuators over their lifetime can be very high and costly. In addition, the gear train in the actuators for driving the damper is constantly under a load by the motor, and as a result, is prone to gear tooth damage due to 60 Hz frequency vibration. Another and possibly worse problem is the high heat build-up due to holding the motor in the stalled position for long periods of time, potentially damaging the motor.

Alternatively, some actuators are provided with a separate holding mechanism as a way of maintaining the damper at its position during normal operation. When energized, a locking mechanism engages and locks the damper into its normal operating position. The locking mechanism requires less power than the drive motor and eliminates or at least reduces gear tooth damage. The actuators of this type are provided with an end switch for detecting whether the damper has reached its normal operating position or a speed sensing device for detecting whether the actuator has stopped driving. Once it is determined that the damper has reached its normal operating position, the actuator switches power from the drive motor to the locking mechanism. The end switches or the speed sensing devices, however, are costly and difficult to implement at the typical elevated operating temperatures of these actuators, approximately 350° F.

Accordingly, it is a primary objective of the present invention to provide an improved actuator which is inexpensive and simple to implement.

Another object of the present invention is to provide such an improved actuator including a solenoid for locking a damper into its normal operating position.

Still another object of the present invention is to provide such an improved actuator having a timer control for switching power between a drive motor and the solenoid.

Yet another object of the present invention is to provide such an improved actuator having the timer control provided on a printed circuit assembly.

Other objects and advantages will become apparent upon reading the following detailed description, in conjunction with the attached drawings, in which:

DETAILED DESCRIPTION

The present invention is directed to an electromechanical actuator for use, for example, in fire and smoke applications for opening and closing dampers or valves. The actuator includes a switch device for supplying power to an electric motor for driving the damper to its operating position. Once the damper arrives at its operating position, the switch device disconnects power to the motor and connects power to a solenoid, which maintains the damper at its operating position. The power which is supplied to the solenoid is significantly lower than the power drawn by the motor, and therefore, power consumption by the actuator is significantly reduced.

Broadly stated, the present invention is directed to an electromechanical actuator which is adapted to be connected to an external device for displacing the external device to a predetermined position and maintaining the external device at that position. The actuator includes a housing which holds a drive motor for driving the external device to the predetermined position when the motor is energized and a brake mechanism for maintaining the external device at the predetermined position when the brake mechanism is activated. A switching device generates switching signals for energizing the motor to drive the external device to the predetermined position and for de-energizing the motor and activating the brake mechanism when a predetermined time has passed from the moment the drive motor is energized, to maintain the external device at the predetermined position.

In accordance with one embodiment of the present invention, a switching device is adapted to be used in an electromechanical actuator for switching power between a drive motor and a low-power holding mechanism. The switching device includes a switching signal generator for producing signals for switching power between the drive motor and the low-power holding mechanism at a predetermined time, and a control circuit adapted to enable the signal generator to produce the switching signal. Also included is a switching device which is connected to the drive motor and the holding mechanism for switching power from the drive motor to the low power holding mechanism when the switching signal is received from the switching signal generator.

Figure 1:
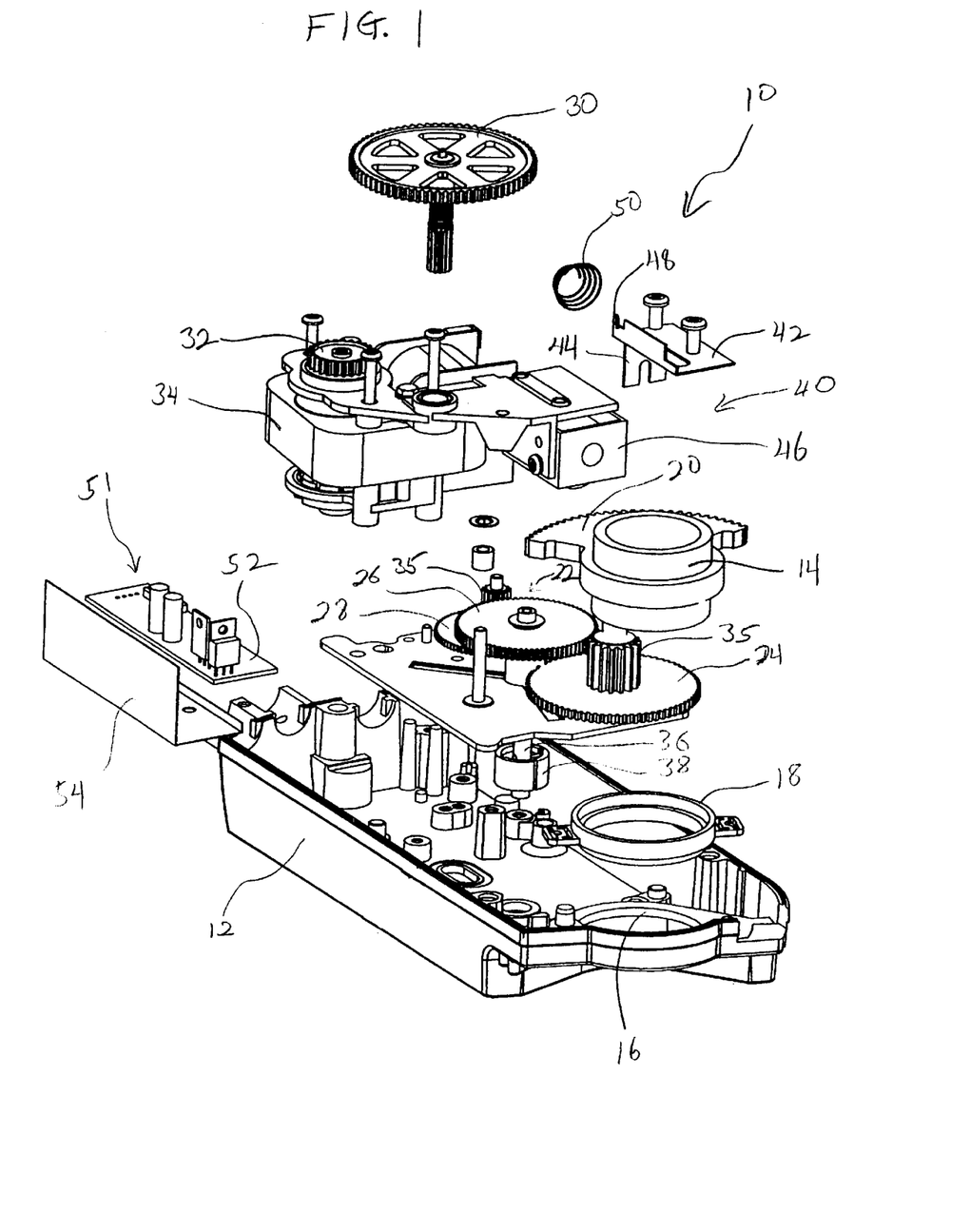
FIG. 1 is an exploded perspective view of an electromechanical actuator embodying the present invention.
Figure 2:
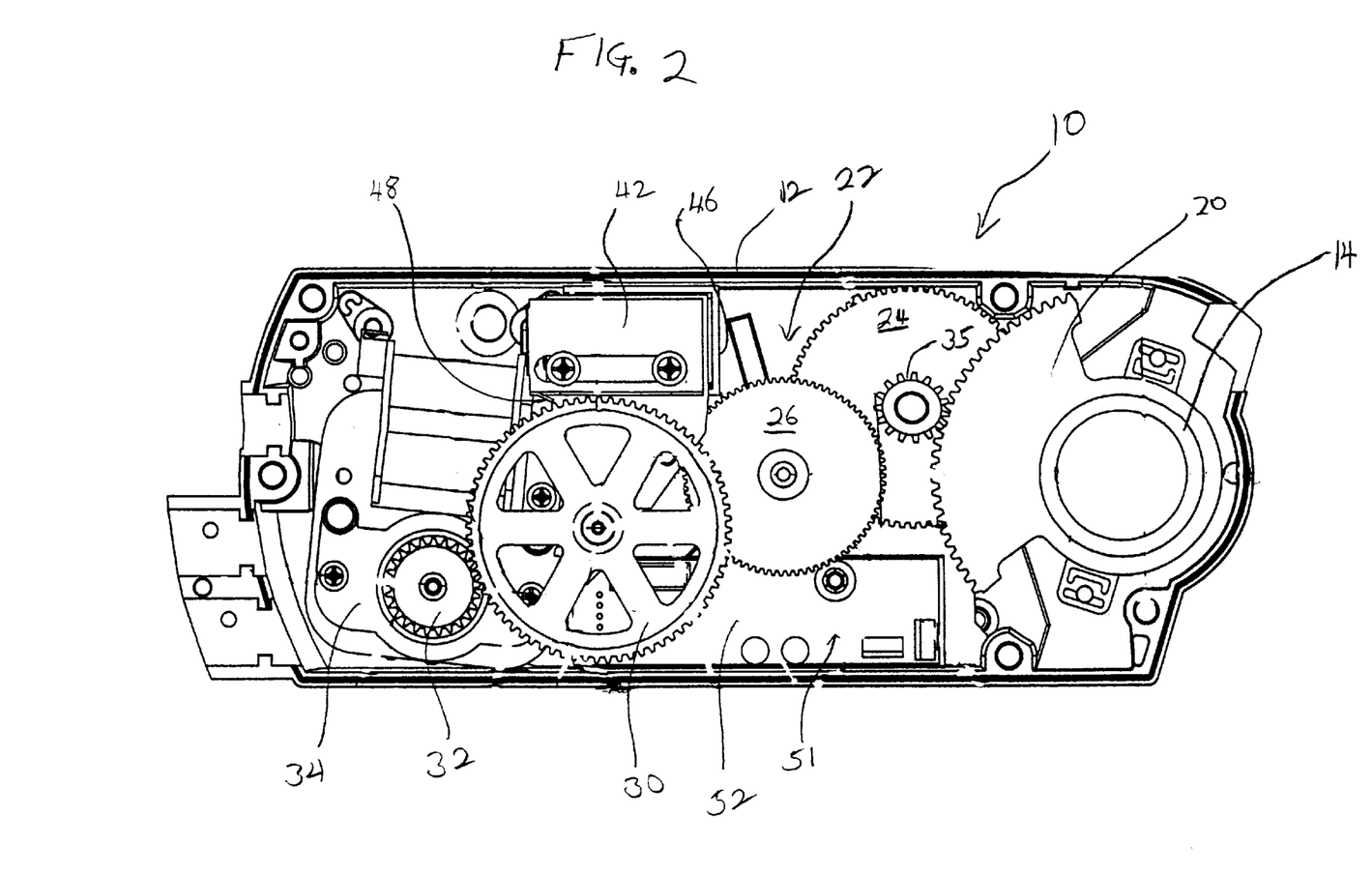
FIG. 2 is a top view of the actuator of FIG. 1.

Turning now to FIGS. 1 and 2, the electromechanical actuator of the present invention is indicated generally at 10 and includes a lower housing 12 (the top housing not shown), which is configured to receive a rotatable output coupler 14 through a coupling hole 16 (best shown in FIG. 1) via a bearing ring 18. The coupler 14 is constructed to operatively couple to an external device such as a damper or a valve (not shown), and is adapted to displace the damper between a default position in the event of a power interruption and a desired operating position when power is being applied to the actuator 10.

The output coupler 14 includes an integral arcuate segment 20 which has a plurality of teeth for engaging a gear train indicated generally at 22. In the preferred embodiment, the gear train 22 includes four gear sets 24, 26, 28, 30 which are operatively engaged with respect to each other. The gear train 22 is arranged with the axes of the gear sets 24, 26, 28, 30 generally forming a zig-zag line along the longitudinal direction of the actuator 10. The gear set 24 of the gear train 22 is engaged with the arcuate segment 20 of the output coupler 14 and the gear set 30 is operatively engaged with a drive pinion 32 of a drive motor 34. In this manner, the torque produced by the motor 34 is transferred and amplified by the gear train 22 to the output coupler 14 when the motor is energized. It should be noted that while the preferred gear train 22 is arranged using the interconnection of four gear sets 24, 26, 28, 30 including their respective transfer pinions 35 (not all pinions shown), a person of ordinary skill in the art will recognize that the geartrain 22 may include more or less than four gear sets, and can be arranged in various other configurations which would allow torque to be transferred between the drive motor 34 and the output coupler 14.

As shown in FIG. 1, an elongated shaft 36 which is concentric with the axis of the gear 26 depends from this gear. A slotted sleeve 38 is attached to the end of the shaft 36 and is adapted to be connected to an end of a retracting spring (not shown), for example, a clock or torsion spring. When the damper is displaced away from the default position by the output coupler 14, the retracting spring is placed under a state of torsion, and applies a force on the output coupler 14 via the geartrain 22 to return the damper to its default position.

To prevent the damper from returning to its default position during the normal operation of the actuator 10, the actuator is provided with a brake assembly 40 which when activated, locks the gear train 22 to prevent it from rotating. The brake assembly 40 includes a slidable lever brake 42 which has an arm 44 (best shown in FIG. 1) which is constructed to hook onto a translationally movable plunger (not shown) in a solenoid 46, so as to slide correspondingly with the plunger when the solenoid 46 is activated. The lever brake 42 also has a tab 48 which is adapted to catch one of the teeth on the gear 30 and lock the gear train 22 in its place when the solenoid 46 is activated. When the solenoid is not activated, a bias spring 50 (shown in FIG. 1) pushes the solenoid plunger, and thus the brake lever 42 and its tab 48, in a direction away from the gear 30, thereby allowing the gear train 22 to rotate either from the drive motor 34 or the retracting spring.

Figure 3:
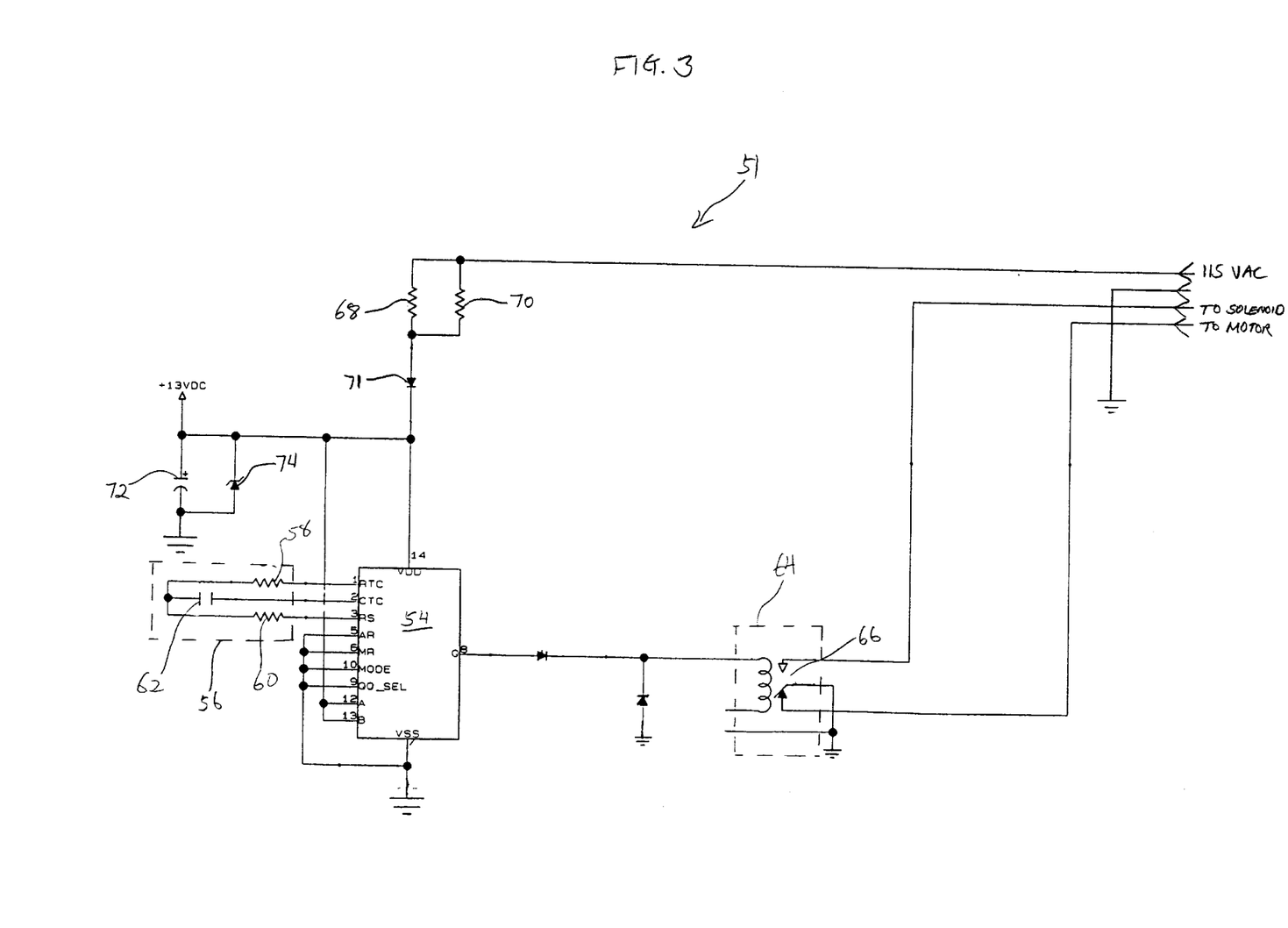
FIG. 3 is a detailed schematic diagram of the circuitry of a timer-controlled switching device of the present invention.

In accordance with one aspect of the present invention, the actuator 10 further includes a switching circuit 51 for controlling power that is applied to the drive motor 34 and the solenoid 46. The switching circuit 51 is implemented on a printed circuit board 52 and protected by an insulation plate 54. Turning now to FIG. 3, the switching circuit 51 includes a solid state timer 54 such as a 4541 B type integrated circuit (IC) chip. A timer control circuit 56 is provided to enable the timer 54 to produce a desired signal. The timer control circuit 56 includes a pair of resistors 58, 60 and a capacitor 62 which are selected in accordance with the requirements of the timer 54 to allow the timer to generate the desired signal, which is supplied to a relay 64. In the preferred embodiment, the resistors 58, 60 have values of 348 and 698 ohms and the capacitor 62 is 0.001 µF. This allows the timer 54 to generate a signal that keeps a switch 66 in the relay 64 connected to the drive motor 34 preferably for approximately 25 seconds, which allows more than enough time for the motor to displace the damper to its normal operating position. The relay 64 is SPDT type in the preferred embodiment. After this period, the timer 54 outputs a signal which causes the switch 66 to disconnect from the motor 34 and connect to the solenoid 46, thereby activating the brake assembly 40 to lock the gear train 22, and thus the damper in its operating position. The timer 54 is also provided with a pair of resistors 68, 70 for reducing the input AC voltage to a level usable by the timer. A diode 71, a capacitor 72 and a zener diode 74 are connected downstream of the resistors 68, 70 to rectify the input AC voltage and regulate it to approximately 13 VDC before it is supplied to the timer 54.

From the foregoing description, it should be understood that an improved eletro-magnetic actuator has been shown and described which has many desirable attributes and advantages. The present actuator includes a braking assembly which keeps the damper at its normal operating position using significantly lower power than a drive motor. Another advantage is that the present actuator uses a timer-controlled switching device for switching power from the drive motor to the braking assembly. The timer-controlled switching device is less expensive and easier to implement at elevated temperature conditions in which the actuators are required to operate.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. An electro-mechanical actuator adapted to be connected to an external device for displacing the external device to a predetermined position and maintaining the external device at the predetermined position, said actuator comprising:

a housing;

means provided in said housing for driving the external device to the predetermined position when said driving means is energized;

braking means for maintaining the external device at the predetermined position when said braking means is activated;

coupling means for connecting said actuator to said external device, and torque transmitting means operationally engaged between said driving means and said coupling means for transmitting torque between said driving means and said coupling means; and, switching means for generating a first switching signal for energizing said driving means to drive the external device to the predetermined position, and a second switching signal for de-energizing said driving means and activating said braking means when a predetermined time has passed from a moment said driving means is energized, to maintain the external device at the predetermined position.

2. The actuator as defined in claim 1 wherein said driving means is an electric motor.

3. The actuator as defined in claim 1 wherein said braking means is a solenoid including a plunger and a frame.

4. The actuator as defined in claim 3 wherein said braking means includes a brake arm connected to said plunger for operatively engaging said driving means when said braking means is activated to prevent the external device from being displaced away from the predetermined position.

5. The actuator as defined in claim 4 wherein said driving means is an electric motor having a gear wheel attached to a drive shaft of said electric motor, said gear wheel being adapted to engage said brake arm when said braking means is activated.

6. The actuator as defined in claim 1 wherein said switching means comprises:

a timer for generating said first and said second switching signals;

a control circuit for providing an input signal required for said timer to generate said first and said second switching signals; and an electronic relay connected to said timer for electrically connecting said timer to said driving means when said first switching signal is received from said timer, and to said braking means when said second switching signal is received.

7. The actuator as defined in claim 1 wherein said driving means is an electric motor and said torque transmitting means is a gear train arranged and adapted to transmit torque generated by said electric motor to said coupling means.

* * * * *

UNITED STATES PATENT AND TRADEMARK OFFICE
CERTIFICATE OF CORRECTION

PATENT NO.    : 6,084,365
DATED         : July 4, 2000
INVENTOR(S)   : Anderson et al.

It is certified that error appears in the above-identified patent and that said Letters Patent is hereby corrected as shown below:

Drawings
Please replace FIG. 1- FIG. 3 with the attached FIG. 1 - FIG. 3.

Signed and Sealed this

Twenty-eighth Day of August, 2001

*Attest:*

*Attesting Officer*

NICHOLAS P. GODICI
*Acting Director of the United States Patent and Trademark Office*